United States Patent [19]

Lee et al.

[11] Patent Number: 5,426,860
[45] Date of Patent: Jun. 27, 1995

[54] PLUMB BOB ASSEMBLY

[75] Inventors: Leonard G. Lee; John S. Lynn; Thomas S. Gardiner, all of Ottawa, Canada

[73] Assignee: Lee Valley Tools Ltd., Ottawa, Canada

[21] Appl. No.: 263,757

[22] Filed: Jun. 22, 1994

[51] Int. Cl.⁶ .............................................. G01C 15/10
[52] U.S. Cl. ........................................ 33/392; 33/393
[58] Field of Search .......................... 33/392, 393, 413

[56] References Cited

U.S. PATENT DOCUMENTS

| | | | |
|---|---|---|---|
| 266,671 | 10/1882 | Bergen | 33/393 |
| 787,896 | 4/1905 | Converse | 33/392 |
| 1,060,855 | 5/1913 | Pipher | 33/393 |
| 1,538,746 | 5/1925 | Reneau | 33/393 |
| 1,577,133 | 3/1926 | Learnihan | 33/393 |
| 2,135,211 | 11/1938 | Johnson | 33/393 |
| 2,791,037 | 5/1957 | Damron | 33/392 |
| 2,803,067 | 8/1957 | Kurschner | 33/392 |

OTHER PUBLICATIONS

Photograph of plumb bobs from The 1994 *American Woodworker* Calendar, ©1993.

*Primary Examiner*—Christopher W. Fulton
*Attorney, Agent, or Firm*—Kilpatrick & Cody

[57] ABSTRACT

A plumb bob assembly including a bob, a collet for suspending the bob from a drill press chuck, and a housing within which the collet and bob may be stored and around which a plumb bob cord may be wrapped when the bob is not in use. The housing protects the tip of the bob from damage and diminishes the likelihood that the cord will become entangled during storage.

7 Claims, 1 Drawing Sheet

PLUMB BOB ASSEMBLY

BACKGROUND OF THE INVENTION

This invention relates to plumb bobs.

Plumb bobs have been used since ancient times in construction and other activities for the purpose of locating points in space relative to each other. More specifically, plumb bobs are utilized for locating one point either directly above or below another known point. While perhaps most frequently used alone, plumb bobs have also been components of tools like levels.

A plumb bob may be simply any weight attached to a cord or string, but greatest accuracy can be achieved where the weight terminates in a pointed tip that lies directly below the suspension point when the bob is suspended by its cord. A wide variety of shapes have been used for plumb bobs, but plumb bobs are generally torpedo shaped with a point on one end and a hole through which the cord exits on the other end. Plumb bobs are today most frequently used in building construction, which means that they are frequently carelessly stored in tool boxes, on pickup truck dashboards, and in carpenters' tool belts. As a result, plumb bob points frequently are damaged as a result of the rough handling they receive during storage, and plumb bob cords are often tangled at the same time.

In addition to use in building construction, plumb bobs are useful in metalworking and woodworking shops. One area of utility in such situations is for the purpose of locating the point on a drill press table that lies directly below the axis of rotation of the drill press chuck. This requires the suspension of the plumb bob from the chuck by in some fashion grasping the cord with the chuck. Many drill press chucks will not close enough, however, to grasp a plumb bob cord, with the result that other provisions must be made for grasping the cord in a manner so that it is centered relative to the chuck.

SUMMARY OF THE INVENTION

The present invention is a plumb bob assembly comprising a bob, a collet for suspending the bob from a drill press chuck, and a housing within which the collet and bob may be stored and around which a plumb bob cord may be wrapped when the bob is not in use. The bob generally has the shape of a hemisphere joined to a cone. At the location of its largest diameter, where the hemisphere and cones meet, the bob includes an annular depression in which a neoprene O-ring is seated. The housing is a generally cylindrical cup-like container. The internal diameter of the housing is slightly larger than the largest diameter of the bob and smaller than the outside diameter of the O-ring when it is seated in the depression in the bob. An annular depression inside the housing receives the O-ring when the bob is seated in the housing, thereby removably locking the bob in place, while the cord is wrapped around the outside of the housing and the collet nests in the bottom of the housing.

In order to use the collet, a loop of the plumb bob cord is inserted through a small diameter hole in the collet and caught with a paper clip, brad or similar structure to prevent the loop from being pulled back through the hole in the collet. The collet is then grasped in the jaws of the drill press chuck in such a manner that the paper clip and cord do not interfere, and cord length is appropriately adjusted.

It is an object of the present invention to provide a plumb bob assembly comprising a highly utilitarian plumb bob and a housing that protects the plumb bob tip when it is not in use.

It is a further object of the present invention to provide a plumb bob assembly with provision for convenient storage of the plumb bob cord when the bob is not in use.

It is another object of the present invention to provide a plumb bob assembly including a collet that facilitates utilization of the plumb bob suspended from a drill press chuck.

These and other objects of the present invention will be more fully appreciated by reference to the accompanying drawings, the following detailed description of those drawings, and the claims.

DETAILED DESCRIPTION OF THE DRAWINGS

Figure 1:
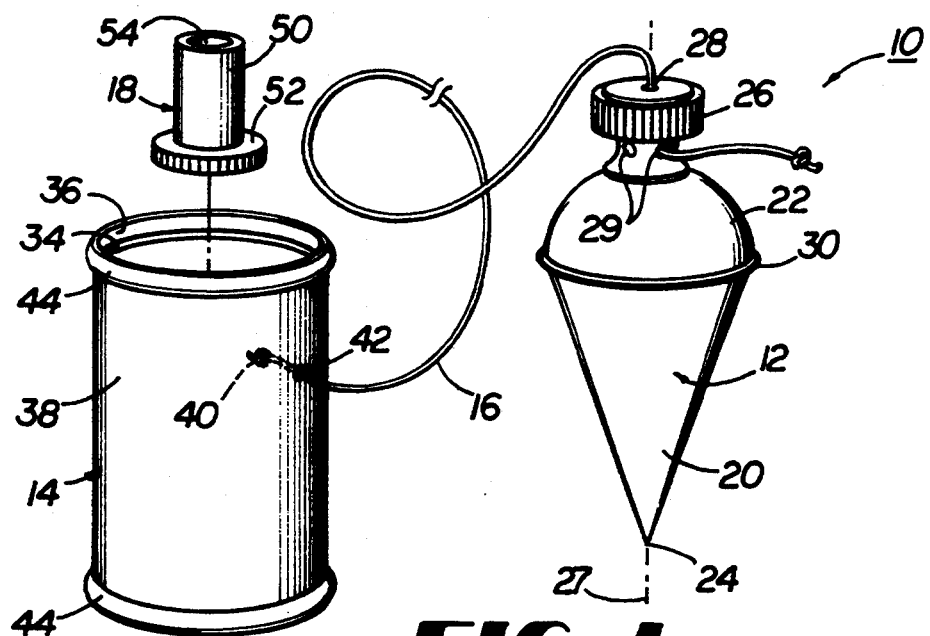
FIG. 1 is a perspective view of the components of the plumb bob assembly of the present invention shown with the bob and collet out of the housing.
Figure 2:
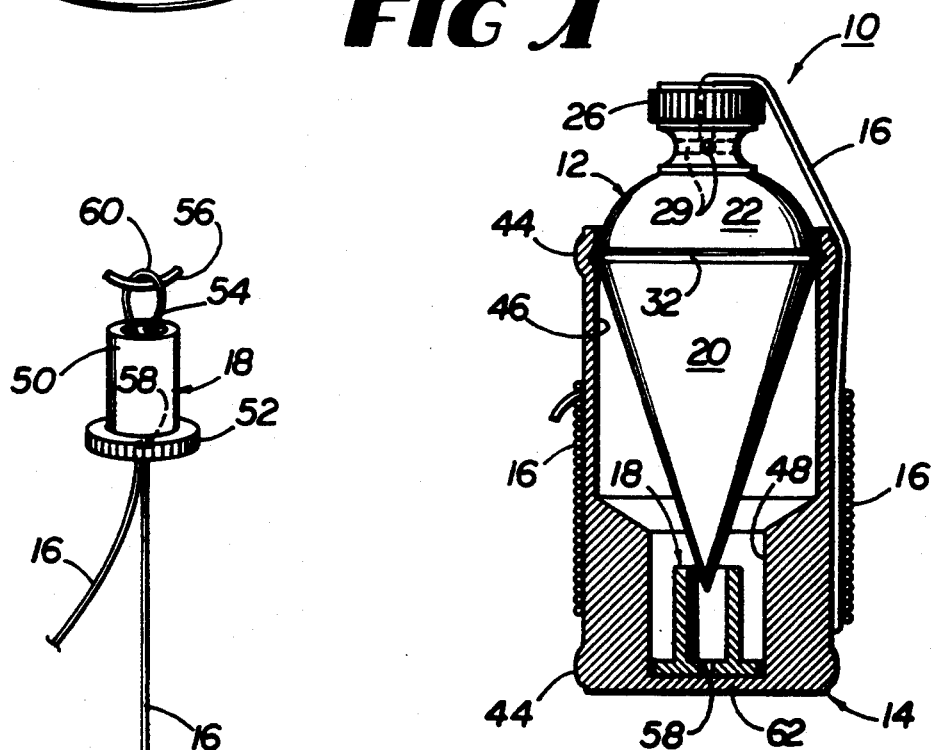
FIG. 2 is a side elevation view of the plumb bob assembly of the present invention with the bob and collet shown in the housing, the cord wrapped around the housing, and the housing and collet shown in section to reveal their interior structures.

The plumb bob assembly 10 of the present invention comprises generally a plumb bob 12, storage housing 14, cord and collet 18. As is illustrated in FIGS. 1 and 2, the plumb bob 12 may generally have the shape of a cone 20 joined to a hemisphere 22. Cone 20 terminates in a pointed tip 24, and a knob-like cap is centered on hemisphere 22 and penetrated by a hole 28 in the center of cap 26 from which cord 16 exits. Bob 12 is symmetrical about its axis 27, an imaginary line passing through tip 24 and the center of hole 28. Hole 28 intersects transverse openings 29 to permit cord 16 to be attached to bob 12 by passing cord 16 into hole 28 and out of one of openings 29 and knotting the end of cord 16.

A neoprene O-ring 30 rests in an annular depression 32 positioned at the largest diameter of bob 12, which diameter, in the embodiment illustrated in FIGS. 1 and 2, is essentially at the intersection of cone 20 and hemisphere Housing 14 is essentially a cylindrical or tube-like container open at one end and having an inside diameter slightly larger than the largest diameter of bob 12 (not including O-ring 30). Housing 14 has an annular depression 34 on its inner wall 36 near the open end.

As will be particularly well appreciated by reference to FIG. 2, annular depression 34 receives O-ring 30 when the conical portion 20 of bob 12 is inserted in housing 14, thereby removably locking bob 12 within housing 14 in a manner that protects bob tip 24 from damage.

With bob 12 so positioned in housing 14, cord 16 may be conveniently wrapped around the outside midsection 38 of housing 14 as shown in FIG. 2 in order to store cord 16 without risk that it will become entangled. The end 40 of cord 16 remote from bob 12 may be captured by inserting it through a hole 42 in the wall 38 of the housing 14. Collars 44 formed or attached at either end of housing 14 serve to prevent cord 16 from sliding off either the top or the bottom of housing 14 by making the housing into a spool-like structure. Collars 44 may have any shape so long as they form a larger diameter portion of housing 14 than its outside 38 midsection.

The inside of housing 14 may have a variety of shapes, including ones closely conforming to the shape of bob 12. Alternatively, the inside of housing 14 can essentially conform to the shape of the outside of the housing so that the inside simply has the shape formed by a tube with one end closed. Additionally, a shape such as that illustrated in FIG. 2 may be used, where the internal diameter of housing 14 progresses from a first diameter portion 46 corresponding to the largest diameter of bob 12 to a smaller diameter portion 48 just larger than the diameter of collet 18. This permits collet 18 to be stored inside housing 14 in a centered location so that tip 24 of bob 12 nests in collet 18.

While the housing 14 illustrated in the Figures has a bottom 62, it should be appreciated that it need not have a bottom 62 in order to provide some protection to tip 24, which would be substantially protected in the embodiment shown in FIG. 2 even if bottom 62 were absent. The absence of bottom 62 would, however, prevent storage of collet 18 in housing 14 in the manner illustrated in FIG. 2.

Figure 3:
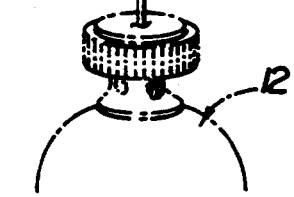
FIG. 3 is a perspective view of the collet and the top of the bob of the present invention showing the collet with a loop of the plumb bob cord drawn through it and the top of the plumb bob as these components would be arranged in order for the collet to be grasped by a drill press chuck (not shown).

FIG. 3 illustrates utilization of collet 18 to suspend plumb bob 12 as might be done, for instance, with collet 18 grasped in the jaws of a drill press chuck (not shown). Collet 18 comprises generally a cylindrical shank 50 to which a larger diameter disk-shaped rim 52 is joined on one end. Shank 50 is penetrated by a bore 54 which is coaxial with a smaller diameter opening 58 centered in rim 52, which opening is sized to receive two strands of cord 16 relatively snugly. A paper clip 56 or similar bit of wire or the like prevents the loop 60 of cord 16 from pulling through collet 18 while it is in use.

As will be appreciated by one skilled in the art, the components of the present invention can be fabricated from a variety of materials, although it is desirable that bob 12 be relatively dense and heavy so that cord 16 is pulled tight and movement of bob 12 can be easily stopped when it is in use suspended from cord 16. Brass, bronze or other metals are particularly desirable materials for bob 12. Each of housing 14 and collet 18 may also be made of brass or bronze. Both housing 14 and collet 18 may also easily be made of a wide variety of other materials, including other metals and plastics. Housing 14 may be made of a resilient material so that the diameter of the wall 36 of housing 12 adjacent to depression 34 expands when bob 12 is advanced into the housing. In such a construction, a far less resilient material than rubber or neoprene may be substituted for O-ring 30, including, for instance, a bead of the brass or other material from which bob 12 is formed, which bead could be formed as part of the bob 12. Cord 16 may be made from any appropriate stretch-resistant material. Cord constructions are desirable that do not tend to impart rotation to bob 12 when it is suspended. Braided silk is considered to be particularly classy by seasoned bob users.

The preceding description and the drawings are provided solely for the purpose of illustration of the present invention. As will be appreciated by those skilled in the art, numerous modifications and variations of the invention as described may be made without departing from the spirit of the invention or the scope of the following claims.

We claim:

1. A plumb bob assembly, comprising a plumb bob attached by a cord to a combined bob housing and cord spool and means for removably securing the bob for storage at least partially in the housing, wherein the securing means comprises an O-ring seated in a first annular depression on the surface of the bob and a second annular depression inside the housing to receive the O-ring when the bob is stored in the housing.

2. The assembly of claim 1, further comprising two collars on the housing defining a region between the collars around which the cord may be wound for storage.

3. The assembly of claim 2, further comprising a collet for suspending the bob from the cord.

4. The assembly of claim 3, wherein the collet comprises a cylindrical shank attached to a disk-shaped rim penetrated by a centered bore.

5. The assembly of claim 1, wherein the combined bob housing and cord spool comprises a generally cup-like container comprising a round tube having two ends, which tube is open at one end and closed at the other end, and one annular collar at each tube end, which collars define a region of the tube around which the cord may be wound for storage.

6. A plumb bob assembly, comprising:
   (a) a plumb bob having:
      (1) a lower, cone-shaped portion joined to
      (2) an upper, hemisphere-shaped portion and
      (3) a knob-shaped cap portion having a central bore for receiving a cord, which cap is centered on the hemisphere-shaped portion, and
      (4) an annular depression in the surface of the bob at the intersection of the hemisphere-shaped and cone-shaped portions, and
   (b) a resilient O-ring seated in the annular depression in the surface of the plumb bob,
   (c) a combined bob housing and cord spool comprising a round tube having two ends, one of which is closed, and one collar on each end of the tube, which collars define a region of the tube around which a cord may be wound for storage, and an annular depression inside the housing for receiving the O-ring when the bob is stored in the housing, and
   (d) a cord attached to the plumb bob.

7. The assembly of claim 6, further comprising a collet for suspending the bob from the cord.

* * * * *